United States Patent Office 3,157,058
Patented Nov. 17, 1964

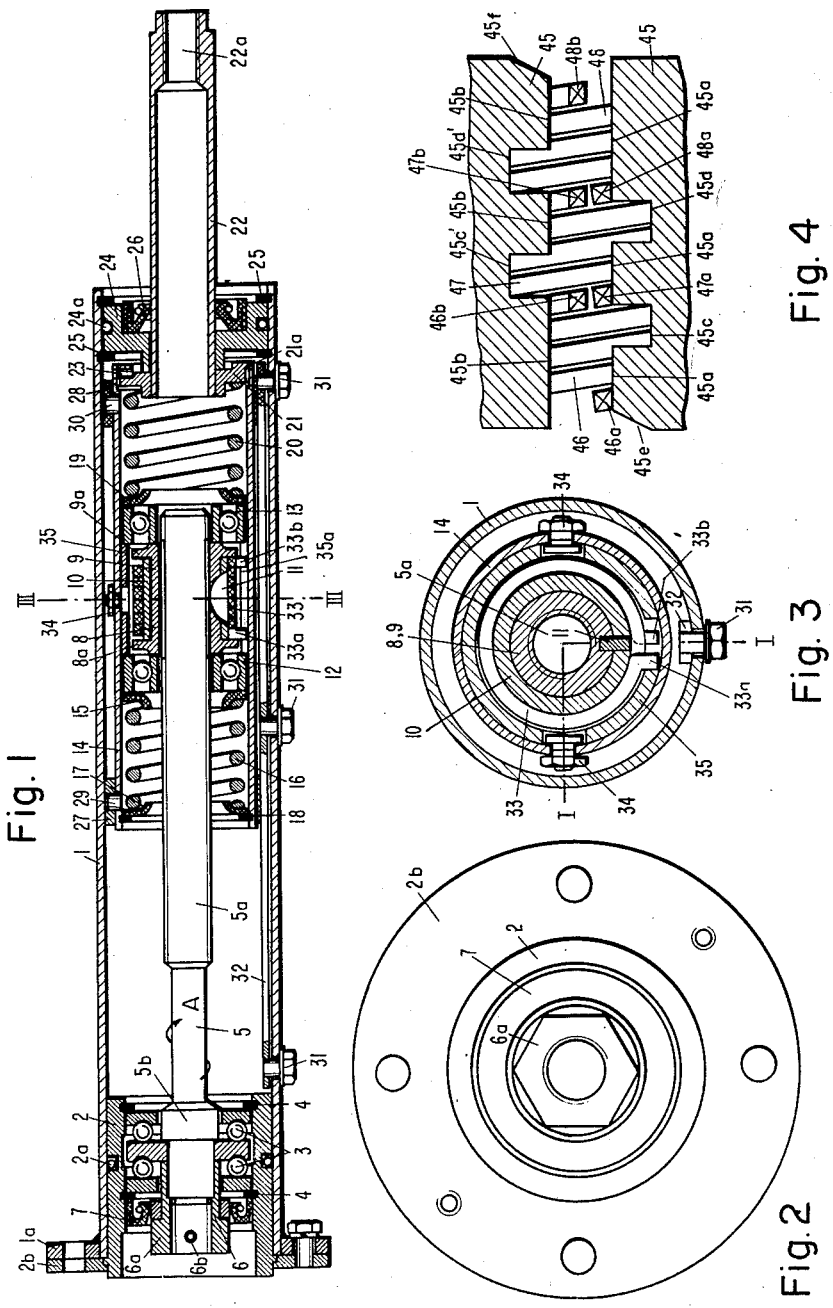

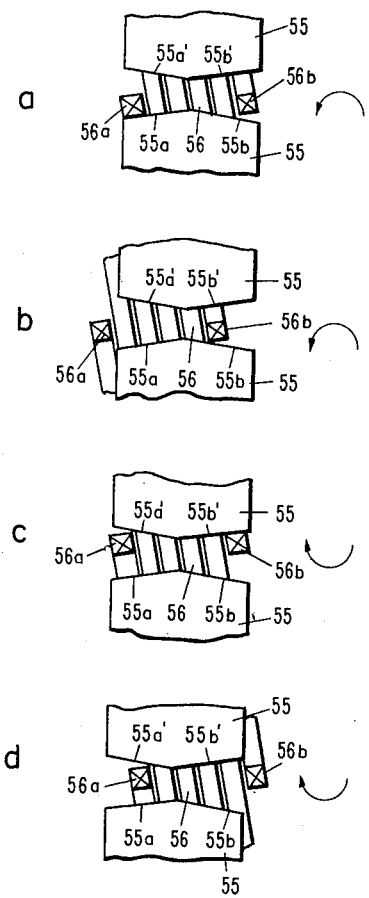

3,157,058
TRANSMISSION MEANS
Richard Haller, Brauerstrasse 51, Zurich, Switzerland
Filed Dec. 7, 1961, Ser. No. 157,697
Claims priority, application Switzerland Dec. 16, 1960
8 Claims. (Cl. 74—424.8)

This invention relates to transmission means comprising an overrunning clutch for the conversion of a rotary motion of a driving member into an axial motion of a driven member.

In a known transmission of this kind the shaft of a driving motor is coupled with a coaxially aligning lead screw projecting into a tubular casing bolted to a flange on the motor casing, said lead screw axially displacing a travelling nut. This nut is axially slidable and rotatable inside a sleeve which is itself axially slidable but non-rotatable in said tubular casing, and which is connected with the driven member for imparting axial motion thereto. The nut is held in a centralised position between two springs. A cylindrically coiled clutch spring embraces a tubular extension of the nut. The spring cannot axially shift on the extension. Tightly fitted inside the sleeve is an axially split bush, the ends of the clutch spring being bent radially outwards and arranged to engage the axial gap in said split bush. When the lead screw is rotated in the one or other direction the nut is first rotatably entrained by the friction engendered in the threads until one end of the clutch spring is rotated against one edge of the axial gap in said split ring. The retention of this end of the spring by said edge causes the coils of the spring to tighten on the tubular extension of the nut and to grip the same, preventing said extension and hence the nut from continuing to be rotated by the lead screw. Since the lead screw itself continues to rotate, the nut is now forced to travel in the lead screw threads in the one or other direction according to the hand of rotation of the lead screw. The nut now axially entrains the surrounding sleeve which is connected wtih the driven member to which this axial motion is imparted. When this latter member reaches its limiting position or if some other cause prevents its further axial motion, then the nut is forced out of its centralised position against the pressure of one of the two compression springs which locate it. In other words, the nut including the clutch spring embracing the nut extension will shift in relation to the split bush which is itself tightly fitted into the sleeve, until the end of the clutch spring nearest the end of the bush rides out of the gap which splits the bush. This at once permits the clutch spring to relax its grip and to release the nut which can therefore now again rotate together with the lead screw without travelling further in the threads and further shifting in relation to or with the sleeve. The transmission is therefore now in overrunning or freewheeling condition.

These known transmission means with an overrunning clutch which acts in both directions of rotation have proved to be extremely suitable for a variety of applications. However their construction is somewhat complicated, they are troublesome to assemble and they are of not inconsiderable length, a fact which in many instances precludes their application or at least causes difficulties in installation. Furthermore, the forces such known transmission means are capable of handling are rather small. The present invention permits these drawbacks to be eliminated.

The invention relates to a transmission means comprising an overrunning clutch for the conversion of a rotary motion of a driving member into an axial motion of a driven member, the clutch means being formed, between a nut which travels on a lead screw rotated by the driving member, and a non-rotatable but axially slidably displaceable sleeve which surrounds said nut, and which is connected with the driven member, by a coiled cylindrical clutch spring which frictionally grips either said nut or said sleeve for coupling said members together, in that the radially off-angled ends of said spring engage an axial gap formed in the member not frictionally engaged, by the torque transmitting end of said spring bearing against one edge of said gap, the nut being retained in axially centralised position in relation to the sleeve by two opposed compression springs in such manner that when the tubular member resists displacement continued rotation of the lead screw will axially shift the nut in relation to the sleeve until the torque-transmitting end of the clutch spring rides off its retaining edge out of said gap or drops into a recess formed in said edge and thus permits the spring to relax its grip and to release the sleeve from the nut which it embraces, the proposed transmission being characterised in that the lead screw carries two externally symmetrical abutting rotatably connected travelling nuts with aligning codirectional threads, each formed with a flange at the non-abutting end, that at least one cylindrically coiled clutch spring, axially non-displaceably in relation to the nuts, embraces said nuts between the flanges, that the ends of said spring are bent radially outwards for engagement of the axial gap in a split bush tightly fitted into said sleeve, that each nut works in a ball bearing slidably held in said sleeve, and that the nuts with their bearings are located by two opposed compression springs, one spring on each side.

Owing to the circumstance that the clutch springs directly embrace the nuts, such a transmission means is much simpler in construction and also more robust than known transmissions of this kind, and it can be used for transmitting forces of greater magnitude. Moreover, the afore-described arrangement of the clutch spring or springs considerably reduces the overall length of the assembly.

An illustrative embodiment of the invention and two modifications of the clutch means are shown in the accompanying drawings in which:

FIGURE 1 is an axial section of transmission means with overrunning clutch for the conversion of rotating motion of a driving member into axial motion of a driven member, constructed as proposed by the invention, the section being an angular section taken on the line indicated by I—I in FIGURE 3;

FIGURE 2 is an end-on view of the transmission, seen from the driven end;

FIGURE 3 is a section taken on the line III—III in FIGURE 1, shown on the same scale as that of FIGURE 2;

FIGURE 4 is a fragmentary part sectional view of a part of a modified form of construction, and FIGURE 5 is a fragmentary part sectional view of a part of another modified form of construction.

The illustrated transmission with an overrunning clutch for the conversion of a rotary motion of a driving member into an axial motion of a driven member comprises a tubular casing 1. The input end of this casing is formed with a flange 1a, and tightly inserted into the same is a bush 2 with a sealing washer 2a. The end of the bush projecting from the end of casing 1 likewise carries a flange 2b. The two flanges 1a and 2b are adapted to be bolted to a flange on the casing of a driving motor not shown in the drawing. Bush 2 contains a double ball thrust bearing 3 retained rigidly in axial position by two split rings 4 sprung into grooves in bush 2. The ball thrust bearing 3 carries one end of a lead screw 5 which has a threaded portion 5a extending axially inside casing 1. The lead screw is formed with a collar 5b which facing the motor bears against the centre ring of the double ball thrust bearing 3. The driven end of the lead screw 5 is likewise threaded for the reception of a fitting 6 secured by a key 6b and formed on the side facing the motor with a hexagonal head 6a. A hexagonal tube section of which one end is fitted to the hexagonal head 6a, whereas the other is fitted to the hexagonal end of the drive shaft of the motor couples fitting 6 and hence the lead screw 5 with the motor shaft. A sealing washer 7 is interposed between fitting 6 and bush 2. The threaded portion 5a of screw spindle 5 works in two nuts 8 and 9 of externally symmetrical shape. The two nuts abut, and both have aligning codirectional internal threads for cooperation with the threads of the lead screw. The relatively remote ends of nuts 8 and 9 each carry a flange 8a and 9a. A bush 10 surrounds the two nuts 8 and 9 between the two flanges 8a and 9a. A woodruff key 11 fitted into a keyway in bush 10 and a segmental keyway of which one half is cut into nut 8 and the other half into nut 9 prevents bush 10 from rotating on the two nuts 8 and 9 and at the same time prevents the two nuts 8 and 9 from rotating in relation to one another. The outside faces of the two nuts 8 and 9 each bear against the inner ring of a ball bearing 12 and 13 respectively. These ball bearings are slidably held inside a sleeve 14. The outer ring of ball bearing 12 bears against a retainer 15 for a compression spring 16, the other end of said spring being supported by a retainer 17 located by a split ring 18 sprung into a groove cut into the end of sleeve 14 nearest the driving end of the assembly. The outer ring of ball bearing 13, on the side facing away from nut 9, likewise bears against a ring 19 for retaining one end of a compression spring 20 of which the other end is held by a collar 21 tightly fitted on to the end of a tubular coupling rod 22 which projects into casing 1. The other end 22a of the coupling rod is threaded for connection with a rod linkage or the like which the transmission is intended to operate. The outer periphery of flange 21 is threaded and the flange is screwed into internal threads in the end of sleeve 14 at the output end of the assembly and held by a locating pin 23. In order to ensure coaxial alignment of flange 21, coupling rod 22, the lead screw 5, and the driving shaft, and in order to ensure a satisfactory fit, the side of flange 21 which faces the output end of the assembly is formed with a coned edge 21a which bears against a correspondingly coned face on sleeve 14. The coupling rod 22 is slidably guided in a bush 24 fitted with a sealing ring 24a. The bush is located by two split rings 25 sprung into grooves machined into the inside periphery of the output end of casing 1. Located in a recess on the outside of bush 24 is a shaft sealing element 26 which embraces coupling rod 22. In order to prevent sleeve 14 from rotating inside casing 1, a ring 27 and 28 respectively is affixed by pins 29 and 30 respectively to the outside of each end of tube 14. Each ring 27 and 28 is formed with a slot, and a rail 32, affixed by screws 31 to the inside of casing 1, slidably engages said slots. The two rings 27 and 28 thus form sliding blocks which guide sleeve 14 inside casing 1. A cylindrically coiled clutch spring 33, conveniently of rectangular section, as shown in the drawings, embraces bush 10. A further bush 35 is secured by screws 34 to the inside of sleeve 14 between the two outer rings of the ball bearings 12 and 13. This bush 35 is a split bush and forms a gap 35a engaged by the off-angled ends 33a and 33b of spring 33.

FIGURE 1 shows the transmission in one of its limit positions. If the driving motor is now started it will rotate the lead screw 5 in the direction indicated by arrow A. The two nuts 8 and 9 together with bush 10 which is keyed to the same are first frictionally entrained by the threaded portion 5a of the lead screw and will rotate, but only until the end 33a of clutch spring 33 is intercepted by the edge of gap 35a in bush 35, said gap being sufficiently wide to provide adequate lateral play to the ends 33a and 33b of the clutch spring. The continued rotation of lead screw 5 will therefore now tighten the clutch spring 33 until no further rotation of bush 10 and hence of nuts 8 and 9 can take place. The nuts 8 and 9 are therefore now captive and travel in the threads of portion 5a of the lead screw 5, in the circumstances illustrated in FIGURE 1 to the left, sleeve 14 and all parts attached thereto participating in this displacement including the coupling rod 22 and its threaded end 22a which therefore moves the rod linkage or the like which is attached thereto. When this linkage reaches its limit position or whenever some other cause prevents the further deflection of the linkage in this direction, further displacement of coupling rod 22 will likewise cease. Nevertheless, even if switched off immediately, the driving motor cannot suddenly stop but needs a certain period of runout. Rotation of the lead screw therefore for the time being continues. Although sleeve 14 cannot continue to move inside casing 1, the two nuts 8 and 9 can continue to do so inside sleeve 14 by compressing spring 16. The off-angled ends 33a and 33b of clutch spring 33 slide along the gap 35a in bush 35 which is fast in sleeve 14 until finally the end 33a of the clutch spring 33 reaches the end of bush 35 and rides off the edge of gap 35a. The release of the end 33a of the clutch spring at once permits spring 33 to relax, and this relaxation is further assisted by the other end 33b of the clutch spring 33 being pulled into contact with edge of gap 35a and thereby further unwinding the clutch spring 33. Braking friction between clutch spring 33 and bush 10 and the two nuts 8 and 9 therefore ceases and the nuts 8 and 9 are free to rotate together with the revolving lead screw 5, 5a, permitting the driving motor which has been switched off to run out quite freely. The transmission functions in analogous manner when the hand of rotation is reversed.

Since the ends of the tubular casing 1 are sealed, it can be filled up with oil.

If the two nuts 8 and 9 are made of a hardenable material such as steel, the provision of bush 10 can be dispensed with and the locking spring 33 arranged to embrace the two nuts 8 and 9 directly. Moreover, if the nuts 8 and 9 consist of a material that cannot be hardened, such as bronze, they can nevertheless be provided with a hard chromium plating and the bush 10 is then likewise dispensable. The only object of key 11 in these later two cases is to keep the two nuts 8 and 9 in alignment and to prevent their relative angular displacement.

If desired, discs for taking up the axial thrust of the clutch spring 33 may be inserted between the ends of bush 10 and the two flanges 8a and 9a.

In the case of transmissions containing a lead screw 5, 5a of considerable length, the end of the lead screw 5, 5a remote from the driving motor may be arranged to work in bearings which are slidably mounted inside the tubular coupling rod 22.

The single clutch spring 33 could be replaced by two or more springs, each spring in gripping position operating as an independent clutch spring, whereas in over running position only one of the external ends of the two outside clutch springs cooperates with the gap 35a in bush 35, the inner end of the first clutch spring bearing against the leading off-angled end of the following spring and the rear end of this spring in turn bearing against the leading off-angled end of the next following spring, and so forth. The serially cooperating springs, when relaxed, then function in the manner of a single spring. Compared with an arrangement in which several clutch springs operate in the manner of a single spring both in gripping and in releasing position, this has the advantage of permitting the overall structural length to be greatly reduced because the several springs can be directly placed end to end. A modification of this latter kind, which otherwise functions in exactly the same way as the previously described embodiment, is illustrated in FIGURE 4.

In this drawing 45 represents a non-rotating split bush which corresponds with the bush 35 described in the previous embodiment, 45a and 45b being the edges of an axial gap extending from one end of the bush to the other. In the illustrated embodiment three clutch springs 46, 47 and 48 embrace the two nuts 8 and 9, which are not shown in the drawing and which work in the threads of a lead screw 5, 5a likewise not shown in the drawing. The ends 46a, 46b, 47a, 47b, 48a, and 48b of the clutch springs 46, 47 and 48 are bent radially outwards. Two recesses 45c, 45d and 45c', 46d' respectively, are cut into each of the edges 45a and 45b which define the gap in the split bush 45. At one end of the bush 45 edge 45a has a bevel face 45e, and at the other end edge 45b has a bevel face 45f.

When the lead screw 5, 5a, not shown in this drawing, rotates, the two nuts 8 and 9 are frictionally entrained and, according to the hand of rotation of the lead screw 5, 5a, either the ends 46a, 47a, 48a or the ends 47b, 48b and 46b will be carried into contact with edge 45a or with edge 45b respectively of the gap in bush 45. This tightens the clutch springs 46, 47, and 48 and the resultant considerable increase in friction now stops the nuts 8 and 9 from rotating with the rotating lead screw 5, 5a. Consequently the nuts will travel in the threads of the lead screw 5, 5a in the one or the other direction. It is assumed in FIGURE 4 that the lead screw rotates in the arrowed direction. This will have caused the ends 46a, 47a and 48a of clutch springs 46, 47 and 48 to be rotated into contact with edge 45a of bush 45, so that the tightened clutch springs will now prevent the nuts 8 and 9 from further participating in the continued rotation of lead screw 5, 5a. Consequently the nuts 8 and 9, together with the clutch springs 46, 47 and 48, will travel to the left (FIGURE 4). When the driven member is intercepted end 46a of clutch spring 46, riding along edge 45a of bush 45, will reach the bevel face 45e and slide down it. At the same time the ends 47a and 48a of clutch springs 47 and 48 will drop into the recesses 45c and 45d respectively cut into edge 45a of bush 45. The grip of the clutch springs 46, 47 and 48 is thus relaxed and the nuts 8 and 9 which are no longer gripped will again rotate together with the lead screw 5, 5a. The clutch springs 46, 47 and 48 are entrained until end 48b of clutch spring 48 is intercepted by edge 45a of the bush. Clutch spring 46 is thereby further unwound and this effect is transmitted, via end 46b of spring 46 which now engages end 47a of spring 47, to this latter spring which in turn completely unwinds spring 48. The transmission is then in fully freewheeling condition. If the hand of rotation of lead screw 5, 5a is reversed the ends 46b, 47b and 48b of clutch springs 46, 47 and 48 will first be carried into contact with edge 45b of bush 45, causing the clutch springs 46, 47 and 48 to be retightened, later to drop into the recesses 45c', and 45d' or to ride down the bevel face 45f and thereby to release the clutch springs 46, 47 and 48 in the same way as already described and thereby to interrupt the transmission of torque.

A transmission fitted with two or more such independently acting serially connected clutch springs is capable of transmitting much greater forces than one containing only one clutch spring. Moreover, the several springs tighten and release much more quickly.

In another embodiment of this transmission the edges defining the longitudinal gap in the bush engaged by the radially outwardly off-angled ends of the clutch spring may be formed with a kind of ramp, that end of the clutch spring which has not been used for tightening the spring riding along said ramp when the nut is displaced in relation to the bush and unwinding the corresponding end of the spring, thus relaxing the grip of the spring. In this form of construction of the transmission the clutch spring is relaxed and the transmission caused to freewheel not by the release of the end of the spring which has tightened the same, but principally by the other end of the spring being unwound. Freewheeling condition is thus more quickly established than in the embodiments already described. The ramp may be formed for instance by an inclined face on a projection of the relative edge of the bush. For preventing the generation of considerable friction when the relative end of the clutch spring rides on to the ramp this may be formed for instance by a roller sunk into the edge of the bush with about one third of its diameter projecting therefrom.

FIGURE 5 shows a particularly useful modification of this type of construction of a clutch spring and a split bush with a longitudinal gap for engagement of the ends of the spring. The bush 35 in the embodiment illustrated in FIGURES 1 to 3 has here been replaced by a bush 55 with a longitudinal division formed by edges defining a V-shaped contour, each edge being formed by two symmetrical inclined faces 55a, 55b and 55a', 55b' which give rise to a gap which narrows from each end to a central throat. The clutch spring in FIGURE 5 is indicated by 56 and, as in the embodiment according to FIGURES 1 to 3, it is coiled around a bush 10 mounted on a divided nut 8, 9 or directly coiled around the two nuts, neither bush 10 nor the nuts being shown in FIGURE 5. Nut 8, 9 is adapted to travel in the threads of lead screw 5, 5a and generally the parts of the transmission omitted in FIGURE 5 correspond with the arrangements illustrated in FIGURES 1 to 3.

It is assumed in FIGURE 5a that the lead screw 5, 5a which is not shown in the drawing rotates in the arrowed direction. The friction between the threads of the lead screw 5, 5a and of the nut 8, 9 causes the nut 8, 9 to rotate together with the lead screw 5, 5a. Consequently the radially outwardly off-angled end 56a of clutch spring 56 will be carried into contact with the inclined face 55a on bush 55 and retained thereby. The clutch spring 56 is thus tightened, increasing its frictional grip on bush 10 or nut 8, 9 and thus preventing the nut 8, 9 from continuing to participate in the rotation of the lead screw 5, 5a. The nut 8, 9 is therefore forced to travel on the lead screw to the left (in FIGURE 5). When later the nut 8, 9 is displaced in relation to the stationary bush 55 to the left the other end 56b of clutch spring 56 will be intercepted by the inclined face 55b of the bush. In the course of the further displacement of nut 8, 9 to the left, this end 56b of the clutch spring will therefore be pushed back in the direction of slackening the coils of the clutch spring 56, and end 56a of the spring will eventually be lifted off face 55a altogether. Friction between the clutch spring 56 and bush 10 or nut 8, 9 will thus be sufficiently reduced for the bush 10 or nut 8, 9 to be completely released by clutch spring 56, permitting the nut 8, 9 again to be rotated by the lead screw 5, 5a. The transmission will then freewheel. Now let it be assumed that the direction of rotation of the lead screw 5, 5a is reversed (as indicated by the arrow in FIGURE 5c). End 56b of the clutch spring 56 will then be carried into contact with face 55b' which retains this end and cause the clutch spring 56 to be retightened on bush 10 or nut 8, 9, preventing the latter from continuing to rotate together with the lead screw 5, 5a. Continued rotation of the lead screw 5, 5a causes nut 8, 9 to travel in the lead screw threads to the right. However, when nut 8, 9 is displaced to the right in relation to the stationary bush 55, and 55a of clutch spring 56 will be carried into contact with the inclined face 55a' (FIGURE 5d) which thrusts back this end and thus causes the tight grip of the coils of the clutch spring 56 to be slackened. End 56b of clutch spring 56 will be lifted away from face 55b' and the transmission will thus again freewheel.

The described construction of bush 55 has the advantage that the end 56a or 56b of clutch spring 56 which is lifted off the corresponding inclined face 55a or 55b' becomes completely free so that the pressure of ends 56a and 56b of clutch spring 56 against the flange 8a or 9a of nuts 8 or 9 will not increase. This modification of the proposed transmission is especially useful in cases in which the transmission is required to transmit forces of considerable magnitude.

In yet another embodiment of this transmission, which is not illustrated by a special drawing, the arrangement may be kinematically inverted by locating the clutch spring or springs inside sleeve 14 or a bush tightly fitted into the same, for frictional cooperation with the inside surface of said sleeve or bush, the ends of the spring being bent towards the inside for engagement of an axial slot in the two nuts 8 and 9 which in this case have no flanges 8a and 9a, or in a bush tightly fitted on to the nuts. The functional effect will then be analogous to that above described excepting that engagement of the clutch spring occurs when the coils of the spring or springs expand and not when they contract.

I claim:

1. A transmission means for the conversion of a rotary motion of a driving member into an axial motion of a drive member, comprising a screw threaded rotatable element for connection to the driving member, a nut means formed of two axially aligned flanged nut elements keyed together mounted on said screw threaded rotatable element so that upon relative rotation between said rotatable element and said nut means said nut means will move axially on said rotatable element, an axially movable but nonrotatable sleeve surrounding said rotatable element and said nut means, a driven element connected to said non-rotatable sleeve for axial movement therewith, a generally axially disposed groove in the interior surface of said sleeve, at least one coiled spring clutch means encircling said nut means and having each end turned radially outwardly, its out-turned ends loosely engaging in said groove, the ends of said coiled spring clutch means being out of alignment with each other so that, as the rotatable element is rotated and the nut means is biased by friction to rotate with said rotatable element, an out-turned end of said coiled spring clutch means engages a wall of said generally axially disposed groove to activate said coil spring clutch means to normally hold said nut means against rotation, said generally axially disposed groove being of an axial length less than the length of said non-rotatable sleeve and terminating at an annular shoulder, biasing means to normally hold said nut means and the coiled spring clutch means in position with the ends of said coiled spring clutch means in said generally axially disposed groove, said biasing means being deflectable when axial movement of said non-rotatable sleeve along said rotatable element is prevented so that the end of said coil spring clutch means that is activated to normally hold said nut against rotation will be moved beyond the end of said generally axially disposed groove, and the coiled spring clutch disengages the said nut means, whereby damage to the device by further rotation of said rotatable element is prevented.

2. Transmission means as claimed in claim 1, characterized in that the surfaces of the nut means which contact the coiled spring clutch means are hardened surfaces.

3. Transmission means as claimed in claim 1, characterized in that a bush is provided to embrace said nut means between the flanges of the nut elements, said bush being embraced by said clutch spring, and said bush being secured against rotation on the nut elements.

4. Transmission means as claimed in claim 1, characterized by the provision of a plurality of clutch springs encircling said nut means.

5. Transmission means as claimed in claim 4, characterized in that the clutch springs are positioned on said nut means in end to end abutting relationship.

6. Transmission means as claimed in claim 5, in which each end of each clutch spring is bent radially outwardly and a split bush tightly inserted into the sleeve provides axially extending edges defining said generally axially extending groove, each of said axially extending edges which define said groove being formed with two recesses for the reception of one of the ends of the clutch springs when the corresponding end of a clutch spring rides off the end of the bush.

7. Transmission means as claimed in claim 6, characterized in that the two edges which define the said generally axially extending groove are formed by two portions sloping in opposite directions thus forming a gap with a central throat.

8. Transmission means as claimed in claim 1, in which each of the edges defining the generally axially extending groove in which the radially outwardly projecting ends of the coiled spring clutch means engage is formed with an inclined ramp-like face along which the end of the clutch spring not acting to tighten the coiled spring clutch means can ride when the nut means is slidably displaced in relation to the bush in the one or other direction, whereby said end not acting to tighten said coiled spring clutch means will cause unwinding of the coils of the clutch spring while riding along said ramp to thereby cause the grip of the spring to be relaxed.

References Cited in the file of this patent
UNITED STATES PATENTS

| 2,417,434 | Mead et al. | Mar. 18, 1947 |
| 2,649,300 | Launder | Aug. 18, 1953 |
| 2,660,028 | Gexer | Nov. 24, 1953 |